US011189040B2

(12) United States Patent
Haverkamp et al.

(10) Patent No.: US 11,189,040 B2
(45) Date of Patent: Nov. 30, 2021

(54) ARRANGEMENT AND METHOD FOR CAPTURING A MARK ARRANGEMENT ARRANGED ON AN OBJECT

(71) Applicant: Carl Zeiss Industrielle Messtechnik GmbH, Oberkochen (DE)

(72) Inventors: Nils Haverkamp, Aalen (DE); Dominik Seitz, Schwaebisch Gmuend (DE); Tobias Held, Noerdlingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 36 days.

(21) Appl. No.: 16/532,303

(22) Filed: Aug. 5, 2019

(65) Prior Publication Data

US 2020/0043183 A1 Feb. 6, 2020

(30) Foreign Application Priority Data

Aug. 6, 2018 (DE) ...................... 10 2018 213 142.2

(51) Int. Cl.
*G05D 3/12* (2006.01)
*G01B 11/00* (2006.01)
(Continued)

(52) U.S. Cl.
CPC ............ *G06T 7/292* (2017.01); *G01B 11/005* (2013.01); *G05D 3/12* (2013.01); *G06T 7/97* (2017.01);
(Continued)

(58) Field of Classification Search
None
See application file for complete search history.

(56) References Cited

U.S. PATENT DOCUMENTS 6,310,644 B1 * 10/2001 Keightley ............ G01B 11/005
 348/140
9,791,569 B2 * 10/2017 Hughes .................. G01S 17/46
(Continued)

FOREIGN PATENT DOCUMENTS

DE 102015205738 A1 10/2016

OTHER PUBLICATIONS

R. A. Boby et al., "Single Image based Camera Calibration and Pose Estimation of the End-effector of a Robot",2016 IEEE International Conference on Robotics and Automation (ICRA), Stockholm, Sweden, May 16-21, 2016.
(Continued)

*Primary Examiner* — Idowu O Osifade
(74) *Attorney, Agent, or Firm* — Falk Ewers; Ewers IP Law PLLC

(57) ABSTRACT

A method and an arrangement for capturing a mark arrangement including an optical mark arranged on an object, the method including capturing images of the mark arrangement together with points in time, determining first evaluation information by evaluating images captured with a first capturing device and further evaluation information by evaluating images captured with a further capturing device, each of the first and further evaluation information relating to respective points in time at which the images were captured, determining a value of a movement variable describing a relative movement between the object and the capturing devices at a predetermined point in time based on the evaluation information determined at the predetermined point in time; and determining the evaluation information of the capturing devices at the predetermined point in time based on images captured at other points in time when no image was captured at the predetermined point in time.

12 Claims, 4 Drawing Sheets

(51) Int. Cl.
*G06T 7/292* (2017.01)
*G06T 7/00* (2017.01)
(52) U.S. Cl.
CPC ............... *G06T 2207/30164* (2013.01); *G06T 2207/30204* (2013.01)

(56) References Cited

U.S. PATENT DOCUMENTS

| | | |
|---|---|---|
| 2006/0221072 A1 | 10/2006 | Se et al. |
| 2012/0050528 A1* | 3/2012 | Davies .................... G01S 17/89 |
| | | 348/136 |
| 2014/0063230 A1* | 3/2014 | Remillard ............... G06T 7/593 |
| | | 348/94 |
| 2017/0010356 A1* | 1/2017 | Demirel ................. G01B 11/25 |
| 2017/0045350 A1* | 2/2017 | Fiekers ..................... G02B 7/28 |
| 2017/0123053 A1* | 5/2017 | Stigwall ................ G01S 7/4816 |
| 2017/0276468 A1* | 9/2017 | Ruck ..................... G01B 21/045 |
| 2017/0365065 A1* | 12/2017 | Stigwall .................... G06T 7/11 |
| 2018/0156608 A1* | 6/2018 | McLean ............. G01B 11/2518 |
| 2019/0191141 A1* | 6/2019 | Fisker ....................... G06T 7/30 |
| 2019/0258225 A1* | 8/2019 | Link ....................... G06T 19/20 |
| 2020/0388053 A1* | 12/2020 | Wallack .................. G06T 7/246 |

OTHER PUBLICATIONS

English language translation of Office Action issued in German Patent Application No. DE 10 2018 213 142.2 (from which this application claims priority), dated Apr. 11, 2019.

* cited by examiner

ARRANGEMENT AND METHOD FOR CAPTURING A MARK ARRANGEMENT ARRANGED ON AN OBJECT

CROSS REFERENCE TO RELATED APPLICATIONS

This application claims priority to German patent application DE 10 2018 213 142.2, filed Aug. 6, 2018, the entire content of which is incorporated herein by reference.

TECHNICAL FIELD

The disclosure relates to an arrangement and to a method for (image-based) capturing of a mark arrangement arranged on an object, in particular to determine movement variables therefrom.

BACKGROUND

Machines such as coordinate-measuring machine's (CMM), processing machines or machine tools typically have a movable part that carries, for example, a sensor to capture coordinates of a workpiece, a machining tool to machine a workpiece, or a workpiece that is to be machined (for example a rotary table). The movable part is therefore in particular a sensor carrier, a tool carrier, or a workpiece carrier. The movable part is movable within a movement range relative to another part of the machine, e.g., relative to a base or a workpiece clamping assembly.

In the case of coordinate measuring machines (or generally in the case of measuring machines), it may be necessary for determining the measurement values to determine values for movement variables, such as values for at least selected spatial degrees of freedom of the movable part or sensor carrier, and especially changes in said values using a measurement system (for example a movement measurement system). DE 10 2015 205 738 A1 includes further background, specifically for the case when a coordinate measuring machine is used, in particular in paragraphs [0003-0007]. Where a movement measurement system is mentioned within the present disclosure, this may relate to a measurement system for determining values for movement variables, such as at least selected spatial degrees of freedom of an object that is to be captured for example within the meaning of an instantaneous position or angular position and/or temporal changes thereof. Rather than to the object, the movement variables can also relate to a mark arrangement as explained below. It is possible to determine herefrom information relating to movements for example in the form of a spatial movement path of the object or of the mark arrangement.

It is likewise known to use hand-guided measurement devices as the object or movable part in particular to capture coordinates, wherein a position and/or the movements of the measurement device are captured in a spatial coordinate system, for example for determining coordinates. One example is the T-Scan CS System by Carl Zeiss Optotechnik GmbH, Neubeuern (Germany). In such cases, it is possible to refer to (movement) path tracking of the movable part (for example relative to a stationary base of the measurement system), wherein in accordance with a capturing or resolution frequency of the movement measurement system, values for movement variables of the hand-guided measurement device are typically continuously captured.

To determine measurement values, the values of the movement variables captured by the movement measurement system can subsequently be subjected to a calculation with the values determined by the measurement device and/or coordinate measuring machine even retrospectively (that is to say after the performance of the measurement method). This can also be referred to as off-line measurement value calculation or off-line measurement value correction, wherein the measurement values can refer to values that are determined using the measurement device and/or movement measurement system.

In the case of processing machines, by contrast, path control or even path feedback control may be provided, in which current values for movement variables of a movable machine part determined by a movement measurement system are taken into consideration for controlling the movement of said machine part in open-loop or closed-loop fashion (for example for moving along a specified desired movement path). This can also be referred to as online measurement value determination or as online measurement value calculation, wherein the measurement values can refer to movement variables of the machine part that are determined by the movement measurement system.

For such applications, but also for other applications that the disclosure likewise encompasses, for optical object capturing and in particular movement capturing, it is furthermore known to apply a mark arrangement having at least one optical mark on the object that is to be captured and to capture said mark arrangement using a capturing device (for example camera) optically and using typically digital images. At least one of the object and capturing devices can be movable in this case, which means that, overall, there is a relative movement between them. Using image evaluation algorithms, the mark or the marks can be identified in the captured images and predetermined properties thereof can be determined. The properties can be position or orientation values of the mark(s) for example with reference to an image coordinate system.

As part of the present disclosure, it is possible in a manner known per se for a location or a position of a mark to be defined by the position of a predetermined center of the mark, or it may be given as such.

Furthermore, it may be typical or required for a plurality of capturing devices (for example a plurality of cameras) to be provided for optically capturing the same mark arrangement or the same object. This is required for example when the three-dimensional properties and/or coordinates of the mark arrangement or of the object are to be determined by triangulation. In this case, at least two images captured from different viewing angles of the object must be present, which can be captured with appropriately positioned and spaced-apart capturing devices. Systems in which more than two images captured from different viewing angles can be used, for example eight images, are also known. In this case, rather than using triangulation, an evaluation (for example for movement variable determination of the object or of the marks) by what is known as the bundle block method can be performed.

Furthermore, known are capturing devices that can determine at least approximately all six spatial degrees of freedom of an object with merely one recording. This can be referred to as pose estimation. One example can be found in the following article: Single Image based Camera Calibration and Pose Estimation of the End-effector of a Robot, R. A. Boby, S. K. Saha, 2016 IEEE International Conference on Robotics and Automation (ICRA), Stockholm, Sweden, May 16-21, 2016. The inventors have recognized that even in this case there may be a demand for determining, and possibly reconciling, a plurality of estimations of degrees of freedom with a corresponding plurality of capturing devices. The pose information determined from a plurality of capturing devices or single-camera systems can be processed using the solution introduced here in the same way (in particular can be interpolated or extrapolated) as the pixel coordinates or angle information described below.

The disclosure is directed at any of the above mentioned variants, but is not limited thereto.

For methods in which images from a plurality of capturing devices are used for an evaluation for example for movement variable determination, it has to date been assumed that the images in each case refer to an identical point in time or, in other words, were captured at the same time. This requires a great synchronization outlay during image capturing. For example, it is known to transmit a common trigger signal to the capturing devices to trigger a simultaneous or, in other words, time-synchronized image capturing. In addition to the general technical challenges of generating a precise trigger signal and in fact attaining synchronized image capturing based thereon, there are problems for example to the effect that the image capturing frequency or rate of the total system is limited by the capturing device having the lowest image capturing frequency or rate.

SUMMARY

It is therefore an object of the present disclosure to simplify optical capturing of an object, in particular to determine movement variables for a movable part (for example a machine part) with a plurality of capturing devices.

This object is achieved by a method and an arrangement for capturing a mark arrangement as described herein. It also goes without saying that, unless otherwise specified or evident, the features mentioned in the introductory description may also be provided individually or in any desired combination in the solution that is disclosed in the present case.

A concept of the disclosure is to perform asynchronous image capturing with a plurality of capturing devices and to determine the required information (for example evaluation information, described below) from the images captured overall for specific point in times for which evaluations (for example movement variable determination) are to take place.

In other words, rather than always performing synchronous image capturing at specified point in times, it may be, according to the disclosure, that at at least one specified point in time no image capturing is performed with at least one capturing device from a plurality of capturing devices. Instead, it is possible to determine from images that were captured at other point in times using said capturing device evaluation information that approximates the evaluation information that would likely be capturable in the case of image capturing at the specified point in time. As will be explained below, in particular interpolation or extrapolation of the evaluation information that was determined for the other point in times is taken into consideration for this.

Consequently, it is not necessary to in fact perform image capturing with each of the capturing devices at the specified point in time and thus, overall, time-synchronized image capturing. Instead, it is possible to estimate from the images that were captured at other points in time the images or image information (or evaluation information) that would be capturable at the specified point in time. One advantage is that the synchronization outlay during image capturing is reduced or may be dispensed with entirely (in other words, no measures for synchronization whatsoever need to be provided). It is also possible to increase the image capturing frequency or, in other words, the scanning rate and consequently also the attainable accuracy. This is true for example in contrast to a case in which a comparatively slow capturing device upwardly limits the image capturing frequency of all capturing devices of a total system to preserve the synchronicity that has hitherto been necessary.

In principle, the specified point in time can be a point in time in the future, for example to estimate a movement which has yet to occur or a position that will be reached next. Alternatively, the point in time can be a point in time in the past, for example to retrospectively estimate a position that was assumed or a movement that was performed at the specified point in time.

The method provided herein, and the arrangement, can be directed at, and/or make possible, position or movement capturing. In particular, the method provided herein and the arrangement can be used for, and/or make possible, path tracking, as mentioned above, or path control and/or path feedback control.

In more detail, a method for capturing a mark arrangement that is arranged on an object (for example a first machine part) and that has at least one optical mark, includes: capturing a plurality of images of the mark arrangement in each case with a first capturing device and with at least one further capturing device (which are arranged, for example, on a second machine part) and capturing the point in time of image capturing (also referred to below as image capturing point in time) for a respectively captured image, wherein the first and the further capturing device capture at least some of the images in a temporally asynchronous fashion and the capturing devices and the object are movable relative to one another (or the first and the second machine part are movable relative to one another), and determining a first piece of evaluation information by evaluating the images of the first capturing device (for example at least one first piece of evaluation information per captured image of the first capturing device) and determining a further piece of evaluation information by evaluating the images of the further capturing device (for example at least one further piece of evaluation information per captured image of the further capturing device), wherein one piece of evaluation information (that is to say each first but also each second piece of evaluation information) in each case refers to the point in time of the capturing of the evaluated image (that is to say each first piece of evaluation information refers to the point in time of the associated evaluated image of the first capturing device, and each further piece of evaluation information refers to the point in time of the associated evaluated image of the further capturing device), and determining a value of at least one movement variable of the relative movement between object and capturing device at the specified point in time (also referred to below as evaluation point in time) from first and further pieces of evaluation information that refer to said point in time, wherein, when no captured image is available for the specified point in time of at least one of the (first or further) capturing devices, a (first or further) piece of evaluation information of said (first or further) capturing device that refers to said specified point in time is determined on the basis of images that were captured with said capturing device at other points in time.

The object can be an immobile or a movable machine part, for example according to one of the examples described in the introductory part. The capturing devices can likewise be arranged on a movable or an immobile machine part, wherein, overall, such combinations of machine parts should be selected such that the aforementioned relative movement is possible.

The mark arrangement can be applied on the object, for example can be adhesively bonded thereto. Alternatively, the mark arrangement can permanently be introduced into the object or can be connected thereto. The mark arrangement can include a plurality of optical marks (but at least one) that are distributed on the object. The marks can have predetermined properties, for example with regard to their shape, form, color gradients and/or intensity profiles, in order to be able to be identified within a captured image in a manner known per se using image evaluation algorithms. Examples that can be mentioned are ring-shaped marks or marks that include a plurality of line-type surfaces, a gray value distribution, a pixel pattern, binary black-and-white or light-and-dark spatial distribution, or the like.

The capturing devices can also be referred to as image recording devices. The captured images are typically digital images that can be defined for example as files typically containing a pixel value distribution. A capturing device can generally be configured as a camera or at least can be referred to as such, even if it does not include an optical lens device. Generally, the capturing device can include an imaging unit, for example having a photosensitive sensor, for example a charge-coupled device (CCD) or complementary metal-oxide-semiconductor (CMOS) sensor, to be able to perform image capturing.

Generally, the capturing devices can be connected to a common control device or to another computational unit, for example of a movement measurement system to which the capturing devices also belong, or generally to a control device of the arrangement explained below. Said control device or computational unit can perform the image evaluations explained below. Alternatively, the capturing devices per se can perform image evaluations (e.g., by using specifically assigned computational units or computational units that are structurally integrated therein).

The image capturing of each capturing device can be performed in accordance with a predetermined image capturing frequency or image capturing rate. The latter can be for example between 10 Hz and 60 Hz. The images captured are typically continuously recorded, stored and/or evaluated, wherein the latter can also be done retrospectively (e.g., after capturing an object movement). In consideration of a selection of a correspondingly high capturing rate, the capturing devices can also be referred to as video cameras and/or perform substantially continuous image capturing or generate continuous image data streams.

The capturing devices can generally have similar embodiments and can, for example, correspond to the same camera type, although this is not necessary. The capturing devices are typically positioned at a distance from one another and have different orientations so as to be able to capture the object and the mark arrangement thereof from different viewing angles.

The points in time of the image capturing can be determined in the same way for each camera, wherein they can be dependent on a selected image capturing process. For example, what is referred to as a rolling shutter method is known, in which an imaging unit of a capturing device (or the pixels thereof) is read successively line by line or column by column for image recording purposes. The point in time at which the complete image capturing is finished (i.e., the complete image file is available) can be defined as the image capturing point in time. According to an aspect of the disclosure, although not necessary, the setting of the image capturing point in time is effected in the same way for all capturing devices. If different settings have been effected, the image capturing points in time can be transformed to common points in time or to a common time scale, for example as part of an intermediate evaluation. According to an aspect of the disclosure, the image capturing point in time for the images of a specific capturing device is always set in the same way. Capturing devices that are operating on what is known as the "global shutter" principle and in which all pixels are read nearly at the same time are used according to an exemplary embodiment. In that case (or even generally speaking, i.e., independently of the reading principle), the center of the exposure time can be used as the image capturing point in time.

In a manner known per se, what is known as a sensor or image coordinate system can be defined for the captured images of each capturing device. Positions within an image can thus be assigned unique coordinates in the corresponding image coordinates system. It is furthermore known that positions in the image coordinate system can be assigned unique values for what are known as camera angles, in particular when the capturing devices do not use telecentric lenses. The camera angles indicate an angle that indicates the viewing angle of the camera onto the corresponding position in the image coordinate system. If the optical mark is located for example at a specific position in the image coordinate system, the current viewing angle or camera angle of the capturing device relative to, or onto, the optical mark can then be determined. Such angle values can be used in a manner known per se to perform triangulation and to determine three-dimensional coordinates of the optical mark.

Furthermore, the first and the further capturing device can perform temporally asynchronous image capturing. It is to be understood that not all captured images must be captured in a time-synchronous fashion. Rather, it may suffice that for example in the case of continuous object capturing, no synchronized image capturing is initiated for example by specification of a trigger signal, with the result that, depending on the individual image capturing frequencies of the capturing devices, at least some of the captured images may not refer to a common capturing point in time. In other words, provision may be made as part of the method to the effect that, for at least selected ones and typically for a majority of or possibly for each captured image of the first capturing device, no image can be captured with the further capturing device that refers to the same capturing point in time as the image of the first capturing device. In general terms, it is thus not possible to form for each capturing point in time image pairs from the images that were captured with the first and the further capturing device and that were captured at said point in time.

The extent of the asynchronicity, for example the proportion of capturing points in time for which no previously described image pairs can be determined, can depend on the properties and in particular the image capturing frequencies of the capturing devices and may possibly not be uniquely predictable. However, in conventional systems, it can be assumed that, in the absence of a common trigger signal for the capturing devices, image capturing takes place in temporally asynchronous fashion, for example because the image capturing frequencies even of capturing devices of the same construction generally slightly deviate from one another at least with respect to the decimal places.

According to an exemplary embodiment, provision is thus made for the first and the at least one further capturing device (but also all further optional capturing devices) to not be actuated for time-synchronous image capturing by way of a common trigger signal.

A piece of evaluation information is understood to mean, within the meaning of the present disclosure, a piece of information (for example a value) for a predetermined variable or property that is to be determined as part of the image evaluation. Such a piece of information can be coded by way of one or more bits, such that a piece of evaluation information can also be stored and/or retrieved as a corresponding data value. In general terms, the evaluation information can contain (for example coded) information or define contents that relate to or indicate a result of the image evaluation.

The image evaluation can be effected by way of conventional image evaluation algorithms. In particular, the image evaluation can be configured to identify the optical mark within the image and for example within an image coordinate system as explained above. In particular, the orientation and/or position of the optical mark can be identified or, in general terms, at least one value for at least one spatial degree of freedom of the optical mark can be identified. Alternatively, as was also explained above, a camera angle can be identified which for example corresponds to a current position of the optical mark in the image coordinate system.

The evaluation information can be stored in a memory of the arrangement that will be described below, so as to be retrieved for later (in particular off-line) evaluations.

The indication that the pieces of evaluation information each refer to the point in time of the capturing of the evaluated image does not imply a method measure that must be taken, for example in the sense of providing the evaluation information with a timestamp. However, this may certainly be an option according to an aspect of the disclosure. For example, the pieces of evaluation information can be provided with a corresponding piece of information that refers to the point in time to which they refer (image capturing point in time) or be stored together with such information as an individual evaluation data set. This makes a determination as to whether evaluation information is available for a specified point in time possible. If no corresponding evaluation data set is determined, the conclusion that at said specified point in time no image capturing with a corresponding capturing device has taken place can be reached.

The specified point in time, which can also be referred to as the evaluation point in time, does not necessarily have to be determined in the sense of a separate method measure, although this may likewise be an option. Instead, the specified point in time can be obtained for example by way of a control device that wishes to perform movement variable determination on the basis of the image capturing.

Provision is made as part of the method for a value for at least one movement variable (for example the instantaneous value of a spatial degree of freedom, such as a degree of freedom of translation or rotation) of the object and/or of the mark arrangement to be determined from first and further pieces of evaluation information that refer to said specified point in time.

A moving variable can generally be understood to be any variable that is related to a movement, in particular, an instantaneous position or an instantaneous orientation of at least one movable component during the movement. Velocity or acceleration can likewise be included in this. In particular, when one of the object and capturing devices is spatially fixed, the movement variable can exclusively relate to the movable component of object and capturing devices (for example indicate only an instantaneous position of a movable object and/or an instantaneous velocity thereof).

The determined movement variable can be used for example to determine a current position and/or orientation of the object (or of the mark arrangement from which a corresponding object position or orientation can be deduced) at the specified point in time. If such pieces of information are determined for a plurality of successive points in time, one movement of the object and/or of the mark arrangement can be recorded therefrom or, in other words, can be tracked. In particular, the time profile of the position and/or orientation within the meaning of a movement path can be determined herefrom.

If the specified point in time lies in the future, the value of a corresponding movement variable can be predicted based on the available pieces of evaluation information. This is relevant for example for path control and/or path feedback control.

As has already been indicated above, it is also possible, knowing a relative arrangement of the mark arrangement on or relative to the object (for example relative to an origin of an object coordinate system), to deduce movement variables of the object from a movement variable of the mark arrangement.

If triangulation is performed, it is possible to deduce an (instantaneous) three-dimensional position and/or orientation of the at least one optical mark and/or of the object on the basis of the first and further piece of evaluation information, which in this case typically indicate camera angles, as movement variable. Even in cases in which no triangulation is performed, (instantaneous) values for all spatial degrees of freedom of the object and/or of the mark arrangement can be determined as movement variable, for example using the aforementioned bundle block method or capturing devices with pose estimation. DE 10 2015 205 738 A1 also discloses possibilities of determining a velocity from an individual image as movement variable.

The case that for the specified point in time no image captured by at least one of the capturing devices is available can be a result for example of the asynchronous image capturing described. On the other hand, this may also occur when the specified point in time lies in the future to predict future movement variables of the object or of the mark arrangement.

Generally, a plurality of specified points in time can be taken into consideration and a plurality of values that refer thereto for movement variables can be determined. Consequently, a time value profile for at least one movement variable can be determined.

As part of the method, it is not necessary to perform, using a separate step, a check as to whether a captured image is available or not at the specified point in time. As will be explained below, this can be an option, however. If, on the other hand, future specified points in time are to be considered, for example as part of path control and/or path feedback control, it may be specified from the start or it can generally be known that at the specified points in time no images for at least one and in particular for none of the capturing devices will be available. In this case, a separate check as to whether images captured at the specified point in time are present can be dispensed with. More specifically, the following cases may thus occur as part of the method:

It may be desirable for example as part of path tracking of the object to determine pieces of evaluation information and values for at least one movement variable at generally any desired points in time during an object movement. In this case, it is possible to determine as part of the method whether for at least one of the capturing devices no image was captured at the specified point in time and whether to proceed on the basis of images which were captured at other points in time.

If it was preset or should generally be assumed that no images of at least one of the capturing devices are available for the specified points in time under consideration, for example, because the points in time lie in the future, separate determination can be dispensed with. The condition that at the specified point in time no image was captured with at least one of the capturing devices can in this case always be considered to have been met, without the need for a separate check. As mentioned, considering future points in time is relevant especially as part of path control or path feedback control if future movements of the object or of the mark arrangement are to be estimated, for example so as to be able to initiate countermeasures in time in the case of deviations from a desired path.

If at the specified point in time no image was captured with at least one of the capturing devices (or if such an image is not available or cannot be available anyway because the point in time is in the future), provision is made for a piece of evaluation information that refers to said point in time to be determined for the corresponding capturing device on the basis of images that were captured with said capturing device at other points in time. In particular, this may be points in time that enclose the specified point in time between them and in particular enclose it immediately between them (that is to say without further capturing points in time being located between them). Likewise, there may be at least two points in time that precede the evaluation point in time and in particular immediately precede it (that is to say without further capturing points in time being located between them).

The images at these capturing points in time can be evaluated analogously to the previous manner to determine first and/or further pieces of evaluation information for the corresponding capturing device. It is then possible to determine the required piece of evaluation information at the evaluation point in time from said pieces of evaluation information, for example using interpolation or extrapolation as explained below.

This makes it possible to approximate the piece of evaluation information that would likely be determinable using actual image capturing at the specified evaluation point in time without the need to actually capture a corresponding image at the evaluation point in time or for it to be available at the evaluation point in time. In the reverse conclusion, this means that temporally asynchronous image capturing can be performed with the capturing devices and yet meaningful object capturing and movement capturing is made possible.

A refinement of the method makes provision for determining as part of the method (that is to say determining for example as a separate method step or a separate method measure) whether an image was captured with both capturing devices at the specified point in time. In particular, it can be determined whether and more precisely which of the capturing devices has possibly captured no image at said point in time or, in other words, whether there is no captured image for at least one of the capturing devices.

Alternatively, it can be provided (for example by presetting) or it can be determined (for example on the basis of user inputs or general process information) that the pieces of evaluation information are to be determined for at least one of the capturing devices on the basis of images that were captured at other points in time, wherein typically the aforementioned separate determination as to whether an image was captured with both capturing devices at the specified point in time is not relevant. In other words, in this variant, provision may be made for a corresponding check to be dispensed with from the start. As explained, this is relevant in particular for cases in which the specified point in time lies in the future.

In summary, if it was determined that at the specified point in time no image was captured with at least one of the capturing devices or no captured image is available for at least one of the capturing devices; or if it is specified or determined that the pieces of evaluation information are to be determined (as standard, as it were) for at least one of the capturing devices on the basis of images that were captured at other points in time, a piece of evaluation information that refers to the evaluation point in time of a corresponding capturing device is determined on the basis of images that were captured with said capturing device at other points in time.

According to a further exemplary embodiment of the method and of the arrangement, for determining a piece of evaluation information from images that were captured at other points in time, the pieces of evaluation information of these images (that were captured at other points in time) are determined and the piece of evaluation information referring to the specified point in time is interpolated or extrapolated therefrom, that is to say interpolated or extrapolated with respect to the specified point in time and in particular on the basis of a time distance with respect thereto. In other words, for determining a piece of evaluation information from images that were captured at other point in times, the piece of evaluation information of said images can be interpolated or extrapolated.

In particular, the following exemplary embodiments can be provided:

Movement path tracking or generally movement variable determination at any desired points in time is to be made possible. In this case, typically a separate check is performed as to whether images were captured by both capturing devices at the points in time under consideration, which in each case represent an evaluation point in time or a specified point in time in the above sense. If this is not the case for at least one of the capturing devices, a piece of evaluation information that refers to the evaluation point in time is interpolated for said capturing device (or for all capturing devices for which corresponding images are missing) from images that were captured with said capturing device at other points in time. These may in particular be pieces of evaluation information of images having capturing points in time that enclose the evaluation point in time typically immediately between them (that is to say without any further capturing points in time being located between them).

Alternatively, movement path control and/or movement path feedback control may be provided to be able to predict future movement variable values (or generally a future movement) on the basis of movement variable values that are typically currently being captured. In this case, the specified point in time lies in the future, and a separate check as to whether at a specified point in time images were captured by both capturing devices is typically dispensed with. Rather, it can be set in advance that such a check should not take place or a corresponding lack of necessity for such a check can be determined before the further method measures are performed. Instead, pieces of evaluation information are determined in this case on the basis of images that precede the specified point in time and typically immediately precede it. The piece of evaluation information at the desired evaluation point in time can be extrapolated on the basis of pieces of evaluation information for images that were captured at those preceding points in time.

In the case of an interpolation, provision may generally be made for the interpolation to be a linear interpolation or for the interpolation to be performed on a polynomial or spline basis. In the case of an extrapolation, a linear extrapolation is typical to avoid undesired pronounced jumps. However, theoretically it is possible for an extrapolation to be performed in this case on a polynomial or a spline basis. It is to be understood that the aforementioned polynomials typically have a degree of greater than one and for example at least a degree of two or three.

Provision may furthermore be made as part of the method or of the arrangement for the interpolation or extrapolation to be performed in dependence on a movement variable of the mark arrangement (or of the at least one mark thereof). The movement variable can be a velocity, an acceleration, a rate of a change in location or a variable from which for example any of the aforementioned variables can be determined.

The movement variable can also refer to the optical mark or, generally, the mark arrangement for example in the image coordinate system and/or can refer to a movement of the mark taking place between two images. The movement variable can be determined using the actually captured images which are used to determine the desired piece of evaluation information. For example, it is possible to determine a velocity of the mark arrangement or of the optical mark from two images that immediately succeed one another and the evaluation information determined therefrom. In particular, a location of the optical mark can be determined for a first image and also for at least one further image, for example the next image. From the respective capturing points in time and the change in location of the optical mark in the images (for example along at least one predetermined coordinate axis), it is then possible to determine the velocity of the optical mark along at least one and typically all coordinate axes of the image coordinate system. In a manner known per se, a difference from the specified point in time to a capturing point in time of one of the images can be determined and the location or the coordinates of the optical mark can be interpolated or extrapolated on the basis of said difference (for example by forming a product of the velocity and the point in time difference, which can be added to the coordinates in one of the captured images). It is thus possible to obtain a value for the location of the optical mark that can be used as the piece of evaluation information or the corresponding camera angle thereof can be used as the piece of evaluation information.

As explained, the movement variable can be determined from at least two captured images. These are typically the images that immediately enclose the specified evaluation point in time (interpolation) or the images that immediately precede said evaluation point in time (extrapolation). Alternatively, the movement variable can also be measured. For example, it is possible to utilize a velocity measurement at the specified point in time. Such a velocity can be measured for example using a suitable speed sensor. In particular, speed sensors that include gyroscopes and/or acceleration sensors can be used herefor.

Alternatively, it should be pointed out that at least in the case of the extrapolation, it is also possible to perform velocity estimations, wherein it is possible, starting from an already travelled movement path (or path history) and with optionally including further knowledge for example with respect to the inertia of the machine and/or the object or the machine drive power, to determine an estimated value and/or isolate a possible region or corridor for possible future positions. A machine can here generally be for example a coordinate-measuring machine or a machine tool.

As has already been explained, it is possible on the basis of the evaluation information to determine values for at least one movement variable of the object and/or of the mark arrangement, wherein typically movement variables of the object are deduced from movement variables of the mark arrangement. It is also possible for the pieces of evaluation information themselves to indicate values (at least one) for movement variables of the mark arrangement. The movement variables of the mark arrangement can be movement variables of all previously mentioned exemplary embodiments and in particular an instantaneous position and/or orientation. In particular, it may be a pixel position or at least one coordinate value, for example in an image coordinate system or in an image plane that is defined in the form of a pixel matrix. Alternatively, a camera angle may be indicated that corresponds to the current pixel position or the pixel coordinates in the image plane or the image coordinate system.

In a refinement of the method and of the arrangement, one of the mark arrangement and the capturing devices are arranged on a moving object (for example a movable machine part) and movable relative to the other of the mark arrangement and capturing devices. The latter can be arranged on a non-movable machine part, for example on a base.

For example, the mark arrangement can be arranged on the moving object and the capturing devices can be arranged in the vicinity of the object, for example on a positionally fixed part of a machine. Alternatively, the capturing devices can be arranged on the object (for example the processing head of a processing machine) and can capture a mark arrangement that is arranged in the vicinity and may be positionally fixed. (Relative) movement variables of the mark arrangement and in particular velocities or position and/or orientation changes or instantaneous position and/or orientation values of the object can also be determined in this case.

Generally speaking, the capturing devices can be arranged on a first part (or region) of a machine and the mark arrangement on a second part (or region), wherein the first and the second part (or the first and the second region) are movable in relation to one another.

Furthermore, provision may be made in the method and the arrangement for the points in time of the image capturing and the specified point in time (or all points in time which may be specified) to refer to a common timescale. To this end, a common time signal can be provided to determine the corresponding points in time and to set for example values for the capturing points in time and/or values for points in time to which the pieces of evaluation information refer. This does not rule out that a stipulation or setting is put in place for the determination of the capturing points in time as long as the values of the capturing points in time refer to the common timescale.

For stipulating the timescale, a Global Positioning System (GPS) signal can be used or precision time protocol (PTP) communication can be provided. In particular, it is possible to transmit a corresponding time signal to all capturing devices and/or to use such a time signal in the case of all image evaluations. In other words, provision may thus also be made for the points in time of the image capturing and/or the points in time to which the pieces of evaluation information refer and/or for the specified point in time to be determined on the basis of a common time signal or, in other words, to be set on the basis of said common time signal.

Providing a common time signal or a common timescale is easier than providing a common trigger signal that must then in fact result in time-synchronous image capturing. One advantage of using a common time signal or a common timescale is the increased accuracy, because all relevant information refers to the common timescale and thus pieces of evaluation information present at the specified point in time can be approximated.

According to a further exemplary embodiment of the method and of the arrangement, the (at least one) determined value for the movement variable is used for path tracking and/or path control or, in other words, path tracking and/or path control is performed on the basis of the movement variable. It is possible as part of the path tracking and/or path control to consider a movement of the object or generally of a movable machine part, that is to say in principle also of a machine part on which capturing devices that are movable relative to the (possibly positionally fixed) object are arranged.

In particular, the following exemplary embodiment of the method and of the arrangement may be provided, including at least one of the following features:

Path tracking is performed in which the specified point in time is in the past and/or lies between points in time at which image capturing took place.

A check is performed as to whether at the specified point in time for at least one of the capturing devices no image was captured. If this is the case, the piece of evaluation information at the specified point in time is interpolated on the basis of images that were captured with the corresponding capturing device at other points in time.

The following exemplary embodiment that includes at least one of the following features can likewise be provided:

Path control and/or path feedback control takes place.

The specified point in time lies in the future or has not yet expired.

No check is performed as to whether at a specified point in time for at least one of the capturing devices no image was captured. Rather, this is assumed or preset.

The piece of evaluation information at the specified point in time is extrapolated on the basis of the images that were actually captured.

Provision may be made here for the object to be part of a coordinate measuring machine and/or of a machine tool. As described, it may in particular be a machine part of said apparatuses and in particular a movable machine part thereof.

According to a further exemplary embodiment of the method and of the arrangement, provision is made for the relative movement to be controlled on the basis of the determined value of the movement variables of the relative movement. This is relevant for example for path control. Alternatively, provision may be made for the value of the movement variable of the relative movement to be used for determining coordinate values. This is relevant for example as part of path tracking when said values are to be included in a calculation for example with the measurement values of a hand-guided measurement device that represents the captured object.

The disclosure furthermore relates to an arrangement, in particular a coordinate measuring machine or machine tool, including:

a mark arrangement that is arranged on an object and has at least one optical mark;

a first capturing device and at least one further capturing device that are movable relative to the object; and a control device that is configured to control the arrangement for performing the following measures:

determining first pieces of evaluation information by evaluating the images of the first capturing device and determining further pieces of evaluation information by evaluating the images of the further capturing device, wherein one piece of evaluation information in each case refers to the point in time of the capturing of the evaluated image; and determining a value of at least one movement variable of the relative movement between object and capturing devices at at least one specified point in time from first and further pieces of evaluation information that refer to said point in time;

wherein, when no captured image is available for the specified point in time of at least one of the capturing devices, a piece of evaluation information of said capturing device that refers to said specified point in time is determined on the basis of images that were captured with said capturing device at other points in time.

The arrangement may include any refinement and any further feature in order to provide or perform all of the steps, operating states and functions mentioned above or below. In particular, the arrangement may be configured to implement a method according to any of the aspects mentioned above or below. All refinements and variants for method features that are worded in the same way or of the same type can likewise be provided in the arrangement.

The control device can be configured to perform individual ones or all of the previously listed measures. Alternatively, it can be configured to initiate all of or at least individual ones of the aforementioned measures by controlling correspondingly suitable, typically electronic or digital functional units. For evaluating the images or determining pieces of evaluation information, the control device can include an evaluation function. In order to initiate the capturing of the plurality of images, the control device can furthermore provide or include a trigger or activation function for the capturing device. The control device can furthermore provide or include a determination function for determining the movement variable and/or a determination function for the piece of evaluation information at the specified point in time.

BRIEF DESCRIPTION OF THE DRAWINGS

The disclosure will now be described with reference to the drawings wherein.

DESCRIPTION OF EXEMPLARY EMBODIMENTS

Figure 4:
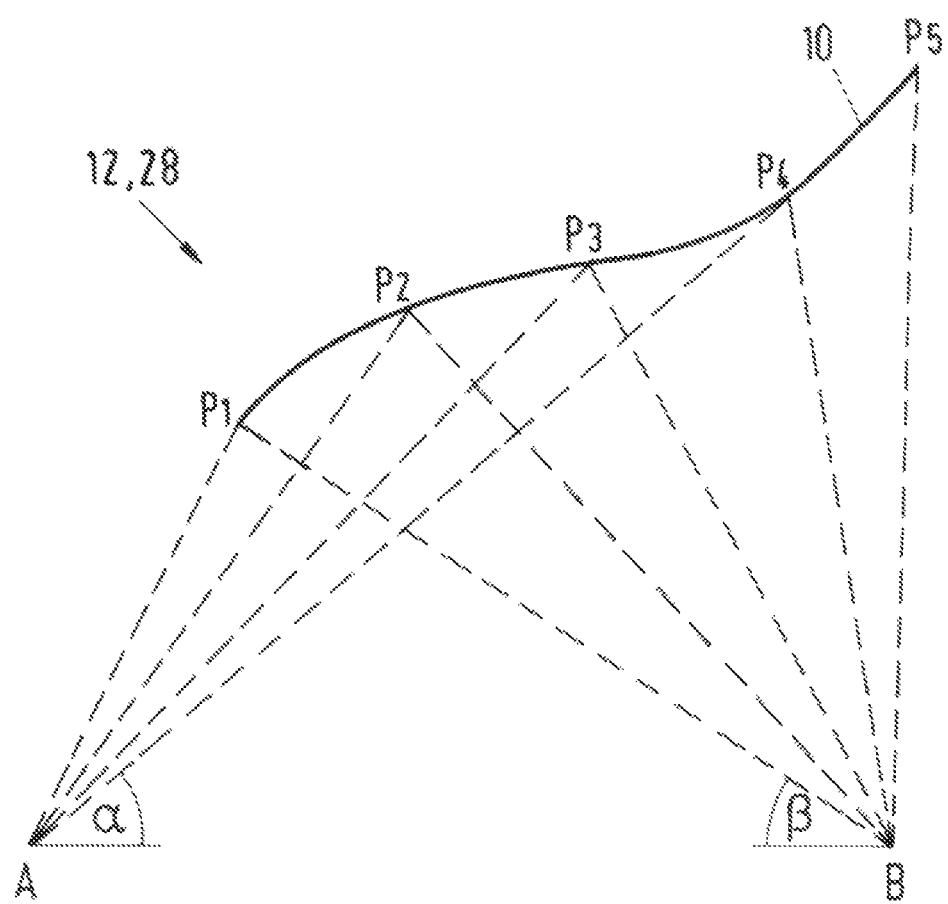
FIG. 4 shows a schematic illustration of synchronous object capturing according to the related art.

FIG. 4 shows a schematic illustration for explaining time-synchronous object capturing in the related art. The position of two capturing devices A and B is schematically shown. Also shown is a (virtual) movement path 10, along which an optical mark 12, which is not illustrated separately, of the mark arrangement 28 moves. The latter is arranged on a moving object (for example a movable machine part) which moves relative to a region (for example a spatially fixed machine part) on which the capturing devices A and B are arranged. Likewise possible is a reverse assignment of the capturing devices A and B and the mark arrangement 28 to a movable and a spatially fixed machine part.

Figure 1:
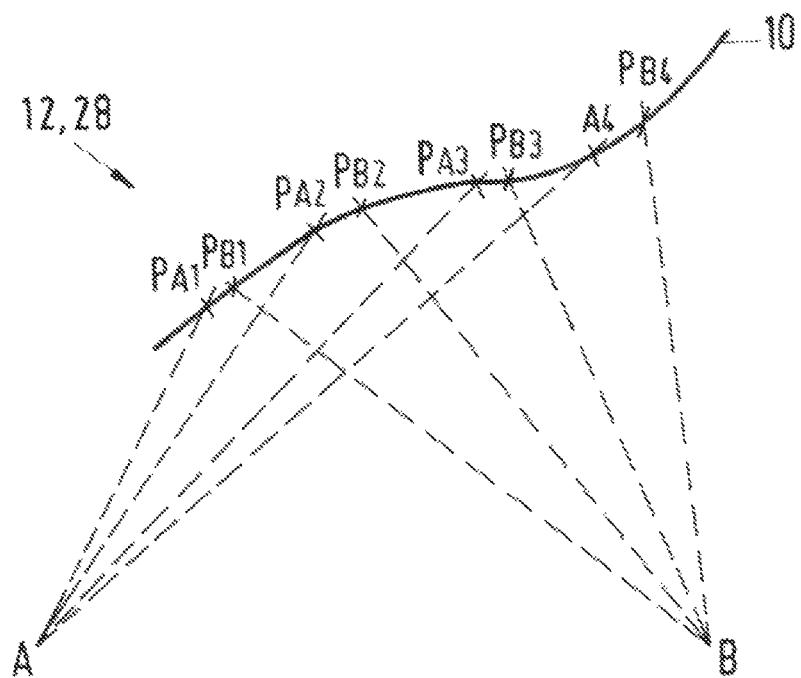
FIG. 1 shows a schematic illustration of temporally asynchronous object capturing.
Figure 5:
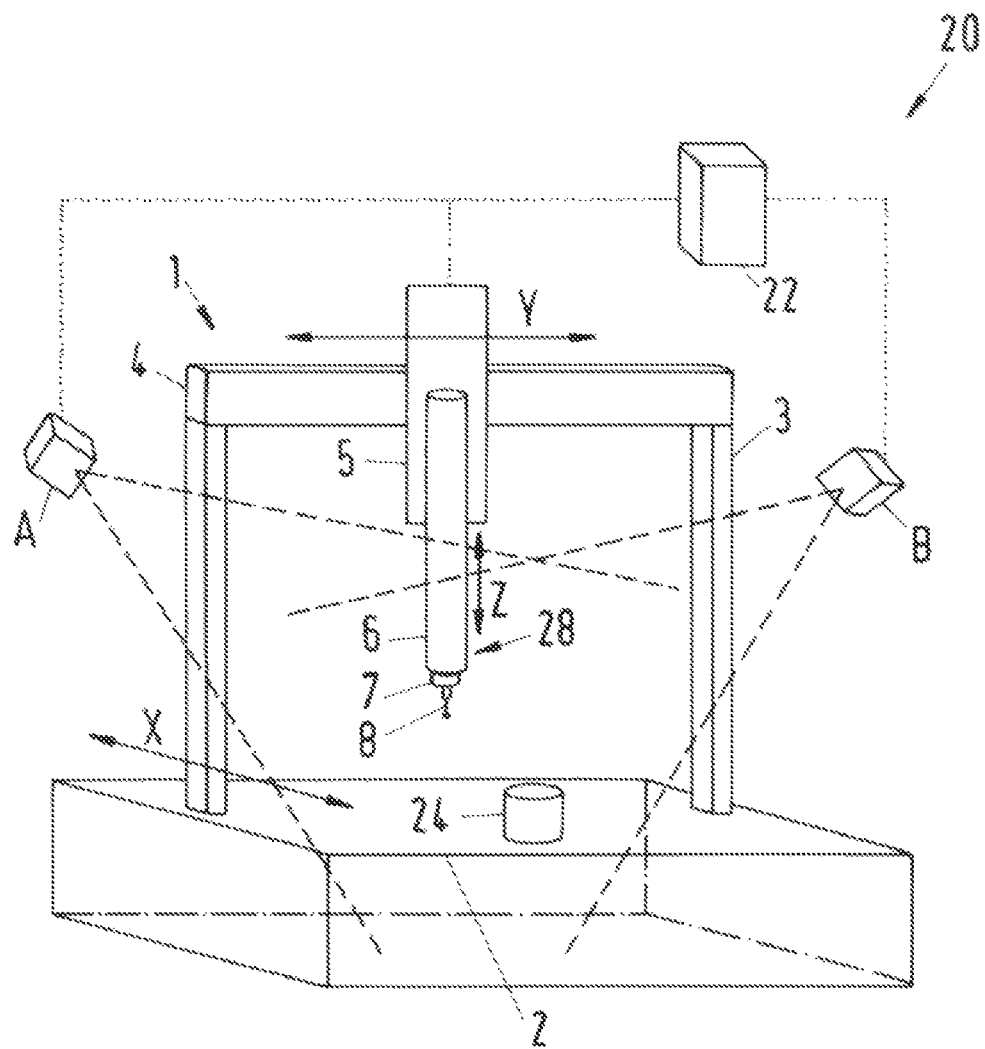
FIG. 5 shows a schematic illustration of an arrangement according to an exemplary embodiment of the disclosure.

Examples of a corresponding positioning of a plurality of capturing devices and capturing of an arrangement of optical marks in a machine (in the present case a coordinate measuring machine) are shown in DE 10 2015 205 738 A1 and are explained therein for example in connection with FIG. 1 thereof. A depiction that is analogous thereto is shown here as FIG. 5, depicting an arrangement 20 according to an exemplary embodiment of the disclosure. This differs from the solution in DE 10 2015 205 738 A1 in particular by way of the temporally asynchronous image capturing and the method described below in order to still be able to perform meaningful evaluations based on the temporally asynchronous images.

FIG. 5 shows the arrangement 20 according to an exemplary embodiment of the disclosure in the form of a coordinate-measuring machine (CMM) 1 of gantry design. The gantry 3, which is movable in the X-direction of a cartesian coordinate system of the CMM 1, is arranged on a measuring table 2 of the CMM 1. A slide 5 can be moved in the Y-direction of the coordinate system along a transverse carrier 4 of the gantry 3. Furthermore, a quill 6 is arranged on the slide 5 movably in the Z-direction of the coordinate system. A measuring head 7, i.e., a sensor, carrying a probe 8, is secured on the lower end of the quill 6. No drives are illustrated in the simplified illustration.

As is illustrated schematically in FIG. 1, the CMM 1 includes a control device 22, which is for example part of a commercially available computer or computer specifically configured for the operation of the CMM 1, said computer being equipped with software for the operation of the CMM 1. The control device 22 is connected to the movable parts of the CMM 1, as illustrated by a dotted line. A workpiece 24 is located on the measuring table within the movement range of the probe 8.

In conventional CMMs, and also in machine tools, measuring transducers and material measures are fitted on the parts that are movable relative to one another in order to determine the position of the sensor carrier (here of the quill 6). From the positions at different points in time it is also possible to determine the speed and optionally also the acceleration. In the illustrated exemplary embodiment of CMM 1, however, the lower end of the quill 6 is captured by a plurality of capturing devices A and B in the form of cameras that are connected to the base of the CMM 1 via connections (not illustrated). The base includes the measuring table 2, in particular. A mark arrangement 28, which is not illustrated separately, is located on the quill 6, said mark arrangement including a mark 12 that will be described below.

The quill 6 thus represents an object that is movable as a movable (machine) part relative to capturing devices A and B which, on account of their connection to the base, represent positionally fixed (machine) parts or are connected to a positionally fixed machine part (of the base).

In the exemplary embodiment illustrated specifically in FIG. 5, only two capturing devices A and B are shown, which in each case completely capture the movement region of the lower end of the quill and thus the mark arrangement 28, but in this case they view in different viewing directions. The capturing devices A and B are, e.g., wide-angle cameras. They are likewise connected to the control device 22, as is illustrated by dotted lines.

As an alternative to the arrangement on a part of the machine (here the CMM 1) that is not moved in the laboratory coordinate system, e.g., the base, the capturing devices A and B can be arranged on the part that is movable in the laboratory coordinate system, e.g., the quill 6. In this case, the mark arrangement 28 is arranged on the part that is not moved in the laboratory coordinate system. Furthermore, it is possible for both the capturing devices A and B and the at least one mark arrangement 28 to be arranged in each case on different parts that are movable in the laboratory coordinate system. If the capturing devices A and B are arranged on a movable part of the machine, the mark arrangement 28 can be stationary in the laboratory coordinate system.

Alternatively, the mark arrangement 28 can likewise be moved even if the capturing devices A and B are aligned with a non-movable part of the machine. To that end, the non-movable part of the machine includes for example at least one display on which the mark arrangement 28 is represented. Taking account of the information about where the mark arrangement 28 is located at a given point in time and/or with what movement it moves, it is then possible to determine the relative movement and/or relative position. A mark arrangement 28 that is likewise moved like the capturing devices A and B, in particular a mark arrangement 28 that is moved at approximately the velocity of the capturing devices A and B, makes it possible to use capturing devices A and B having a normal aperture angle of the captured spatial region or even having a narrow aperture angle.

Turning back to FIG. 4, in the related art, the capturing devices A and B perform time-synchronous capturing, that is to say they capture the object 12 or the mark arrangement 28 that is arranged thereon in each case at the same points in time. As was explained in the introductory part, it is necessary to provide herefor with a comparatively great outlay a trigger signal to initiate the synchronous image capturing. FIG. 4 shows five positions $P_1$ to $P_5$ at which the mark 12, which is not illustrated separately, is located during the image capturing by way of the capturing devices A and B at different points in time (relative to the capturing devices A and B). Positions $P_1$ to $P_5$ correspond to positions along the movement path 10. The capturing points in time of the images captured by the capturing devices A and B at said positions $P_1$ to $P_5$ are spaced apart in accordance with an image capturing rate.

FIG. 4 furthermore shows dashed ray paths that represent a ray path from the optical mark 12 at a respective position $P_1$ to $P_5$ to the capturing devices A and B and vice versa. According to said ray paths, the mark 12 is captured at a position within an image capturing plane, described below, of the capturing devices A and B. The illustrated ray paths show that a position $P_1$ to $P_5$ of the mark 12 is associated with in each case a specific ray path and thus a specific position within the image capturing plane, but also with a specific viewing angle (or camera angle) $\alpha$ and $\beta$ of the capturing devices A and B onto the mark at a corresponding position $P_1$ to $P_5$. A corresponding viewing angle $\alpha$ and $\beta$ of the capturing devices A and B is depicted merely by way of example for selected ray paths in FIG. 4.

Without discussing this in more detail here, it is known that positions in an image capturing plane at which for example the optical mark 12 is located can be uniquely assigned a corresponding viewing angle α and β of a capturing device A and B. This can be done for example based on the geometric ratios and/or optical properties of the system setup or of the capturing devices A and B. It is furthermore known that, on the basis of the corresponding viewing angles α and β, triangulation can be performed so as to be able to determine three-dimensional coordinates of the mark 12 or of the position $P_1$ to $P_5$. It is furthermore possible likewise in a manner known per se to obtain herefrom a movement variable in the form of an (instantaneous) position and/or an (instantaneous) orientation of the object 12 along the movement path 10. Further examples of possible movement variables were mentioned in the introductory part.

As explained, a special feature of the related art shown in FIG. 4 is that the image capturing is time-synchronized. The ray paths of an image capturing operation, illustrated in dashed lines, therefore also intersect in the same positions $P_1$ to $P_5$ of the movement path 10 or always capture the mark 12 at identical positions $P_1$ to $P_5$ along the movement path 10 because of the time-synchronicity.

FIG. 1 shows a schematic illustration, which is analogous to FIG. 4, but in which two capturing devices A and B capture an object, not illustrated separately, or an optical mark 12, applied thereon, along a movement path 10. Once again, ray paths are shown in dashed lines, which indicate individual image capturing operations or image capturing points in time of the capturing devices A and B. However, in this case the disclosure makes provision for the capturing devices A and B to perform no time-synchronized image capturing. Instead, the capturing devices A and B operate with in each case their own and in particular different, and consequently asynchronous, image capturing rates. This significantly reduces the outlay in terms of synchronization with respect to the related art shown in FIG. 4.

However, it is clear from FIG. 1 that as a consequence, the capturing points in time of the capturing devices A and B are spaced apart and therefore the optical mark 12 is captured at respectively different positions $P_{A1}$ to $P_{A4}$ (first capturing device A) and $P_{B1}$ to $P_{B4}$ (further capturing device B). The captured images of the optical mark 12 consequently no longer refer to common capturing points in time nor to common positions of the optical mark 12 along the movement path 10.

If an evaluation is to take place on the basis of images both of the first and of the further capturing device A and B, for example the triangulation described above, it should be ensured for obtaining meaningful results that the evaluated images or pieces of evaluation information that are derived therefrom still refer to a common capturing point in time (that is to say relate to a common position along the movement path 10). Such a state should at least be approximated. The latter is made possible by the method the arrangement 20 according to an exemplary embodiment of the disclosure.

Figure 2A:
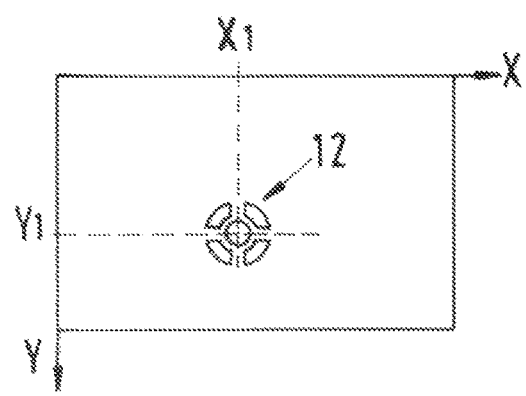
FIGS. 2A and 2B show examples of captured image contents in the exemplary embodiment shown FIG. 1.
Figure 2B:
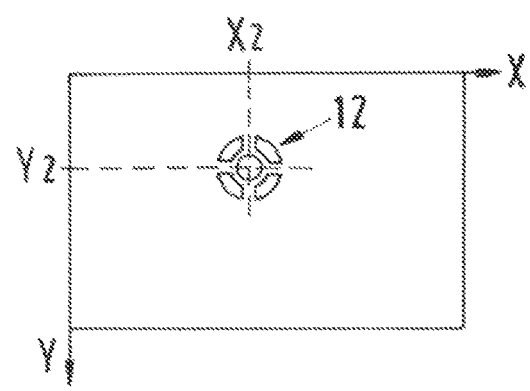

FIGS. 2A and 2B show examples of captured images of the capturing device A at different points in time or at different positions $P_{A1}$ and $P_{A4}$. Furthermore, an image coordinate system X, Y for these images is shown. On the basis of this coordinate system X, Y, a position within the images or within an image plane can be indicated by corresponding coordinate values $X_1$, $Y_1$ and $X_2$, $Y_2$. Such coordinate values are relevant for example in order to be able to describe the position of an optical mark 12, which is illustrated merely by way of example as a ring having multiple gaps, within the captured images. As an alternative to corresponding coordinate values, it is also possible to indicate pixel positions, or the coordinate values can be defined in the unit pixel.

It is possible to furthermore determine, as a movement variable of the mark arrangement 28, a velocity along a corresponding coordinate axis X, Y from a change in the coordinate values along a coordinate axis X, Y for example between two images that were captured in succession and in knowledge of the associated capturing points in time.

A coordinate value (along both or merely one coordinate axis X, Y), a pixel position or a camera angle that is associated with such values or positions and is in particular uniquely assigned can be determined for each of the captured images as a piece of evaluation information. Furthermore, this piece of evaluation information can be assigned a piece of time information or a timestamp and be stored for example together therewith as an individual evaluation information data set.

Figure 3:
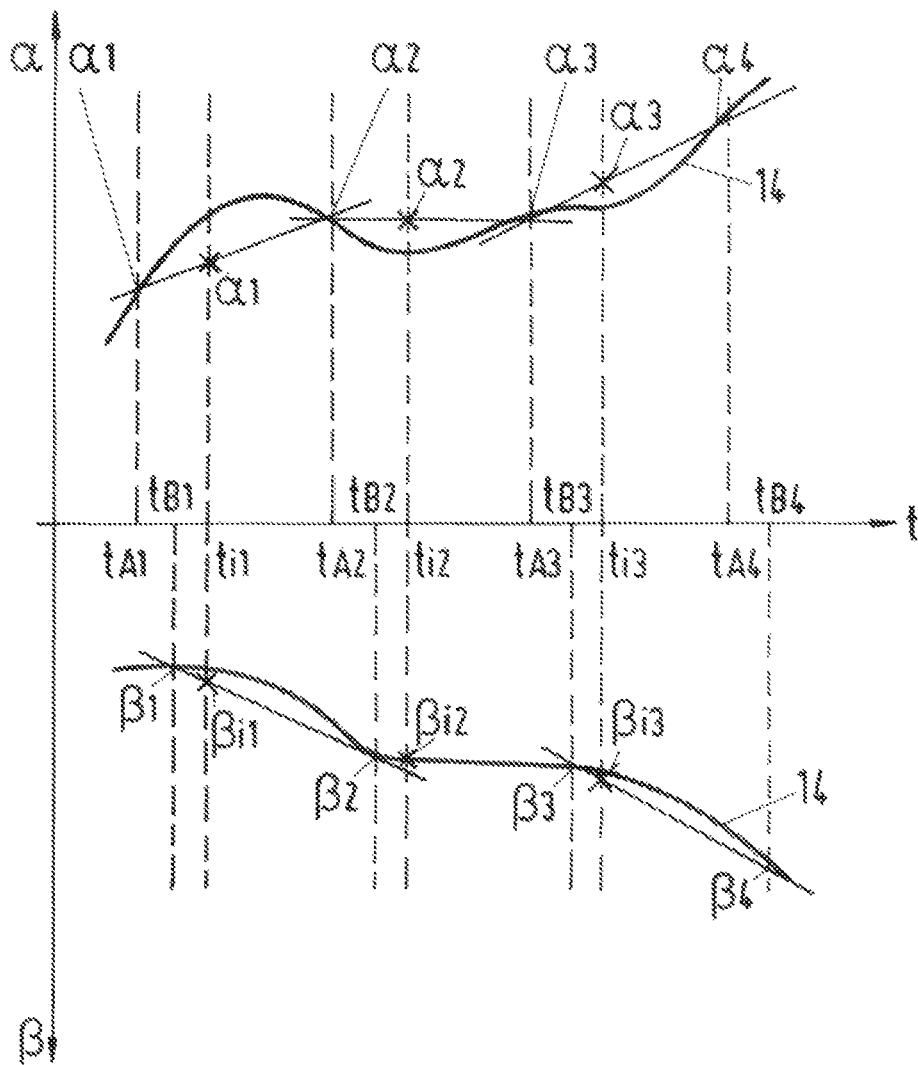
FIG. 3 shows a schematic illustration for determining pieces of evaluation information for a specified point in time on the basis of images that were captured at other points in time.

FIG. 3 shows a schematic illustration of an interpolation or extrapolation that has been made possible by the disclosure. In this case, the camera angles α and β that were described on the basis of FIG. 4 are determined as pieces of evaluation information for each of the captured images. In this case, values of the angle α are pieces of evaluation information for the images of the first capturing device A and values of the angle β are pieces of evaluation information for the images of the further capturing device B. The α values are plotted along the upper portion of the vertical axis in FIG. 3 and the β values are plotted along the lower portion of the vertical axis. Furthermore included is a time axis t, wherein, as a result of the moving object or of the moving optical mark 12 that is applied thereon, a point in time on the time axis corresponds to an associated position along a movement path 10 of the object or of the optical mark 12.

Initially apparent are points in time $t_{A1}$ to $t_{A4}$, which correspond to the capturing points in time of the images from FIG. 1 that were captured at the individual positions $P_{A1}$ to $P_{A4}$ of the optical mark 12. The point in time $t_{A1}$ for example corresponds to the capturing point in time of the image at the position $P_{A1}$ etc. For images captured at the corresponding points in times $t_{A1}$ to $t_{A4}$, in each case a value for the angle α can be determined as the piece of evaluation information (see also the above description of FIGS. 2A and 2B). Said pieces of evaluation information are designated in FIG. 3 with $α_1$ to $α_4$ or with $β_1$ to $β_4$ for the angle β. The values $β_1$ to $β_4$ here refer to points in time $t_{B1}$ to $t_{B4}$, which were captured at the positions $P_{B1}$ to $P_{B4}$ in FIG. 1. The different positions of the points in time $t_{A1}$ to $t_{A4}$ and $t_{B1}$ to $t_{B4}$ along the time axis t once again illustrate the asynchronicity of the image capturing operations by the capturing devices A and B.

In the following description, it is assumed that a point in time $t_{i1}$, for which corresponding pieces of evaluation information α and β are to be determined from actually captured images or pieces of evaluation information α and β, is specified or obtained. The point in time $t_{i1}$ can be obtained for example from a control device that performs path tracking of the optical mark 12 and determines for this point in time as the movement variable of the relative movement an instantaneous position value (for example by triangulation on the basis of the values α and β that are available at that point in time). Alternatively, a separate method step of the method according to an exemplary embodiment of the disclosure may be provided for determining such a point in time $t_{i1}$.

First, as a separate method step, a check is performed as to whether images were captured for both capturing devices A and B at the point in time $t_{i1}$. In the present case, this is not the case. For this reason, it is necessary to determine pieces of evaluation information at the specified evaluation point in time $t_{i1}$ from the actually captured images or the pieces of evaluation information $\alpha_1$ to $\alpha_4$ and $\beta_1$ to $\beta_4$ thereof. This will now be explained below for the interpolating angle value $\alpha_{i1}$ plotted in FIG. 3.

First, the points in time are determined that enclose between them, and in particular immediately enclose between them, the specified point in time $t_{i1}$ (that is to say there is no further capturing point in time between such a point in time and the point in time $t_{i1}$). With reference to the capturing device A or the values $\alpha$, this relates to the points in time $t_{A1}$ and $t_{A2}$. The respective pieces of evaluation information $\alpha_1$ and $\alpha_2$ are determined for said points in time $t_{A1}$ and $t_{A2}$, for example by reading from a memory and/or by evaluating the corresponding images if this was not done.

Next, a velocity is determined as a movement variable of the optical mark 12 that said mark had between the point in times $t_{A1}$ and $t_{A2}$ and is then used for interpolation.

More specifically, the coordinate values of the optical mark are determined at least along the X-axis shown in FIGS. 2A and 2B at the points in time $t_{A1}$ and $t_{A2}$, which are shown below as $x_{A1}$ and $x_{A2}$ and generally as pixel values or pixel positions. In the knowledge of the associated capturing points in time $t_{A1}$ and $t_{A2}$, it is possible to determine a movement velocity V of the optical mark 12 at least along the X-axis as a quotient of the differences of $x_{A2}$ and $x_{A1}$ divided by the difference of $t_{A2}$ and $t_{A1}$.

Examples of the values are $t_{A1}$=0.01 s and $t_{A2}$=0.02 s and also $x_{A1}$=10 pixels (pxl) and $x_{A2}$=11 pixels, wherein the X-coordinate axis includes for example a value range from 0 pixels to 300 pixels. This thus gives a velocity v=dx/dt=1 pxl/0.01 s=100 pxl/s Next, the available in pieces of evaluation information $\alpha_1$ and $\alpha_2$ can be interpolated on the basis of said velocity. As an alternative, it is also possible to interpolate the coordinate values in the image capturing plane that correspond to said pieces of evaluation information $\alpha_1$ and $\alpha_2$ in order to derive again a corresponding angle value from the interpolated coordinates.

This interpolation for obtaining the evaluation point $\alpha_{i1}$ that is to be interpolated can be obtained for example from the following equation $\alpha_{A1}+v\cdot(t_i$ to $t_{A1})$. If, as an alternative, first the pixel value was to be interpolated on the basis of an analogous equation ($x_{i1}=x_{A1}+v\cdot(t_i$ to $t_{A1})$), a pixel value of 10.5 pixels would be obtained with the above values.

The desired piece of evaluation information $\alpha_{i1}$ can thus be interpolated from pieces of evaluation information $\alpha_1$ and $\alpha_2$. Alternatively, the desired piece of evaluation information $\alpha_{i1}$ can be determined on the basis of an interpolation of pieces of evaluation information relating to other variables (for example the x-coordinate values), wherein the corresponding piece of evaluation information $\alpha_{i1}$ can then be determined from the result of the interpolation.

The same applies of course to desired values of the angle $\beta$, if no images were captured at a specified point in time. In the exemplary embodiment shown in FIG. 3, it is possible in this way to determine, for all shown specified point in times $t_{i1}$ to $t_{i3}$, at which no image capturing took place, $\alpha$ and $\beta$ values (see $\alpha_{i1-3}$ and $\beta_{i1-3}$ in FIG. 3).

The aforementioned exemplary embodiment corresponds to a linear interpolation, although this is not necessary. Alternatively, interpolation on the basis of polynomials (preferably having a degree of at least 2) or interpolation on spline basis is possible. FIG. 3 therefore also correspondingly shows an exemplary embodiment in which $\alpha_{1-4}$ and $\beta_{1-4}$ are used as supporting points of a spline curve 14. The determination of a mathematical description of such a spline curve 14, in particular determining intermediate values $\alpha_{i1-3}$ and $\beta_{i1-3}$, is known per se and will therefore not be explained in more detail. It is advantageous that even in this exemplary embodiment, the disclosure makes possible the determination of desired pieces of evaluation information for any desired points in time and without synchronization of the image capturing being necessary. These can be used for determining a desired movement variable of the relative movement (here a triangulated instantaneous position).

It is understood that the foregoing description is that of the exemplary embodiments of the disclosure and that various changes and modifications may be made thereto without departing from the spirit and scope of the disclosure as defined in the appended claims.

What is claimed is:

1. A method for capturing a mark arrangement including at least one optical mark arranged on an object, the method comprising:
   capturing a plurality of images of the mark arrangement together with points in time at which each of the plurality of images are captured with a first capturing device and at least one further capturing device, the first and at least one further capturing devices capturing at least one of the plurality of images in a temporally asynchronous fashion, and the first and at least one further capturing devices and the object being movable relative to one another;
   determining first evaluation information by evaluating images captured with the first capturing device and further evaluation information by evaluating the images captured with the at least one further capturing device, each of the first and further evaluation information relating to respective points in time at which the images were captured with the first and at least one further capturing devices;
   determining a value of at least one movement variable describing a relative movement between the object and the first and at least one further capturing devices at at least one predetermined point in time based on the first and further evaluation information determined at the at least one predetermined point in time; and
   wherein, when no captured image is available for the predetermined point in time of at least one of the capturing devices, a piece of evaluation information of said capturing device that refers to said predetermined point in time is ascertained based on images that were captured with said capturing device at other points in time.

2. The method as claimed in claim 1, further comprising:
   determining whether an image was captured with both the first and at least one further capturing devices at the at least one predetermined point in time; or
   determining or predefining that evaluation information for at least one of the first and at least one further capturing devices are to be determined based on the images that were captured at the other points in time.

3. The method as claimed in claim 1, further comprising:
   interpolating or extrapolating the evaluation information of the images that were captured at the other points in time to determine the evaluation information for the at least one of the first and at least one further capturing devices.

4. The method as claimed in claim 3, further comprising:
   performing the interpolating or extrapolating of the evaluation information of the images that were captured at the other points in time depending on a movement variable of the mark arrangement.

5. The method as claimed in claim 4, further comprising:
determining the movement variable of the mark arrangement based on a movement variable measurement and/or based on at least two of the plurality of images of the mark arrangement that were captured.

6. The method as claimed in claim 1, wherein the points in time at which each of the plurality of images were captured and the at least one predetermined point in time refer to a common timescale.

7. The method as claimed in claim 1, further comprising:
utilizing the value of the at least one movement variable describing the relative movement for path tracking and/or path control.

8. The method as claimed in claim 1, wherein the object is a part of a coordinate measuring machine and/or of a machine tool.

9. The method as claimed in claim 1, further comprising:
controlling the relative movement based on the value of the at least one movement variable describing the relative movement; or
determining coordinate values based on the value of the at least one movement variable describing the relative movement.

10. An arrangement comprising:
a mark arrangement arranged on an object and including at least one optical mark;
a first capturing device and at least one further capturing device, the first and at least one further capturing devices being movable relative to the object; and
a control device configured to control the arrangement to:
determine first evaluation information by evaluating images captured with the first capturing device and further evaluation information by evaluating the images captured with the at least one further capturing device, each of the first and further evaluation information relating to respective points in time at which the images were captured with the first and at least one further capturing devices;
determine a value of at least one movement variable describing a relative movement between the object and the first and at least one further capturing devices at at least one predetermined point in time based on the first and further evaluation information determined at the at least one predetermined point in time; and
wherein, when no captured image is available for the predetermined point in time of at least one of the capturing devices, a piece of evaluation information of said capturing device that refers to said predetermined point in time is ascertained based on images that were captured with said capturing device at other points in time.

11. The arrangement as claimed in claim 10, wherein the arrangement is a coordinate measuring machine.

12. The arrangement as claimed in claim 10, wherein the arrangement is a machine tool.

* * * * *